2,199,030

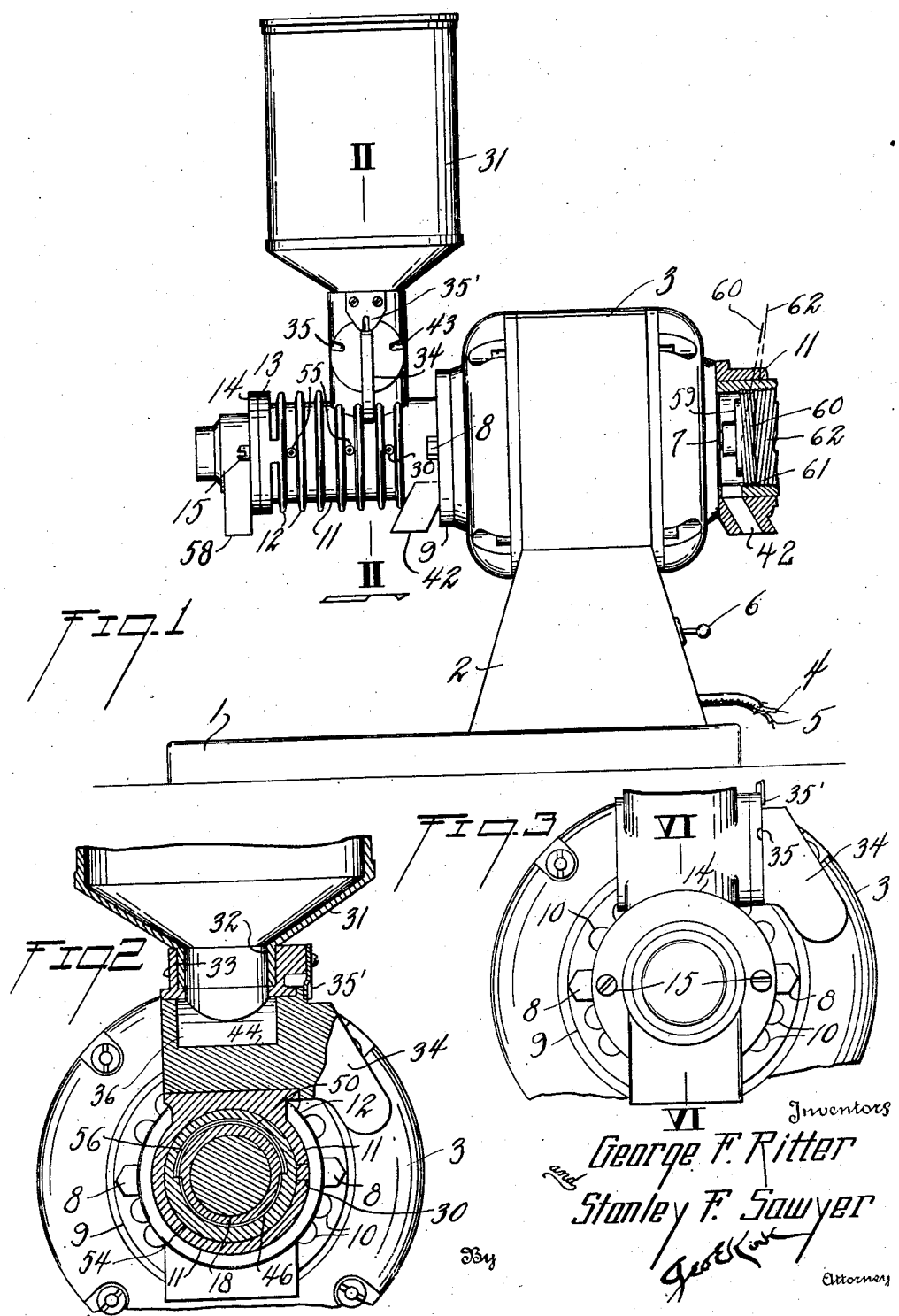
April 30, 1940. G. F. RITTER ET AL 2,199,030
CEREAL GRINDING
Filed March 16, 1938  2 Sheets-Sheet 1
Inventors
George F. Ritter
and Stanley F. Sawyer Patented Apr. 30, 1940

UNITED STATES PATENT OFFICE 2,199,030

CEREAL GRINDING

George F. Ritter and Stanley F. Sawyer, Toledo, Ohio; said Ritter assignor to said Sawyer Application March 16, 1938, Serial No. 196,199

1 Claim. (Cl. 83—14)

This invention relates to sub-dividing material by mechanical action.

This invention has utility in milling cereals especially selectively for single stage effectiveness to differing degrees of fineness in adapting to special purposes as breakfast foods and different baking purposes.

Referring to the drawings:

Fig. 1 is a side elevation, with parts broken away, of an embodiment of the invention in a portable unit adapted for household or bakers' uses;

Fig. 2 is a section on the line II—II, Fig. 1, showing features of the feed from the hopper;

Fig. 3 is a view from the left of Fig. 1, parts being broken away, showing a discharge;

Figure 4:
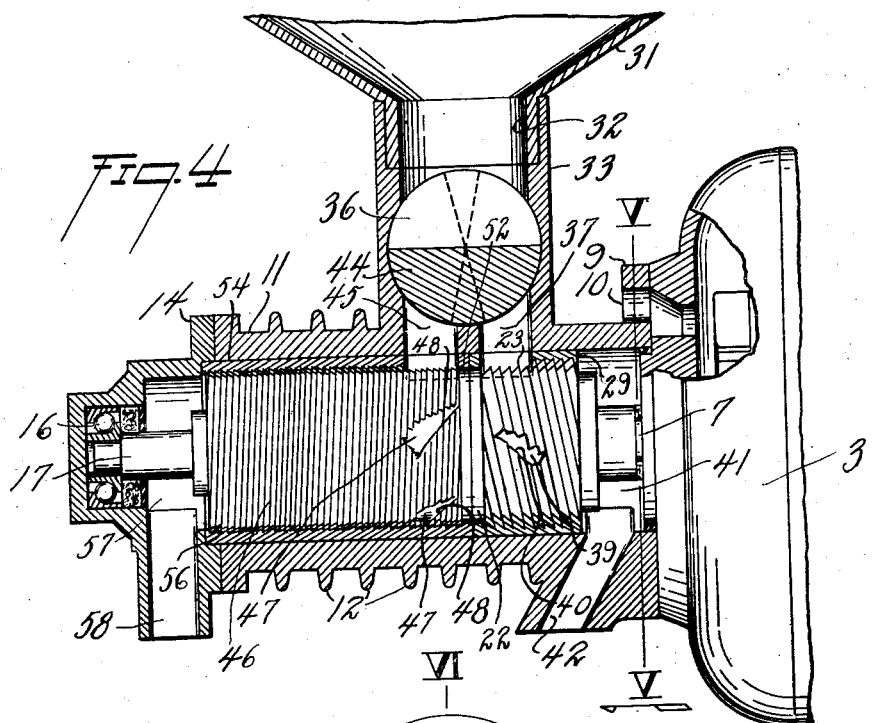
Fig. 4 is a section through the mill on the line VI—VI, Fig. 3, parts being broken away, showing the valve and feed into the grinder or mill therefrom.
Figure 5:
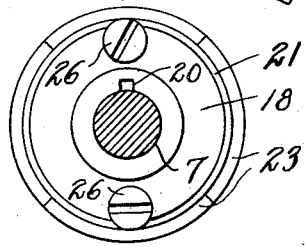
Fig. 5 is a section on the line V—V, Fig. 4, showing the rotor assembly.

Base 1 (Fig. 1) is shown carrying standard 2 mounting electric motor 3, to which electric current supply lines 4, 5, extend. Switch 6 may be operated to cut in or out the motor 3 and thereby effect rotation of motor shaft 7. Bolts 8 mount plate 9 on the motor 3. This plate 9 has openings 10 (Fig. 3) therein as ventilation ways for the motor operation.

Figure 6:
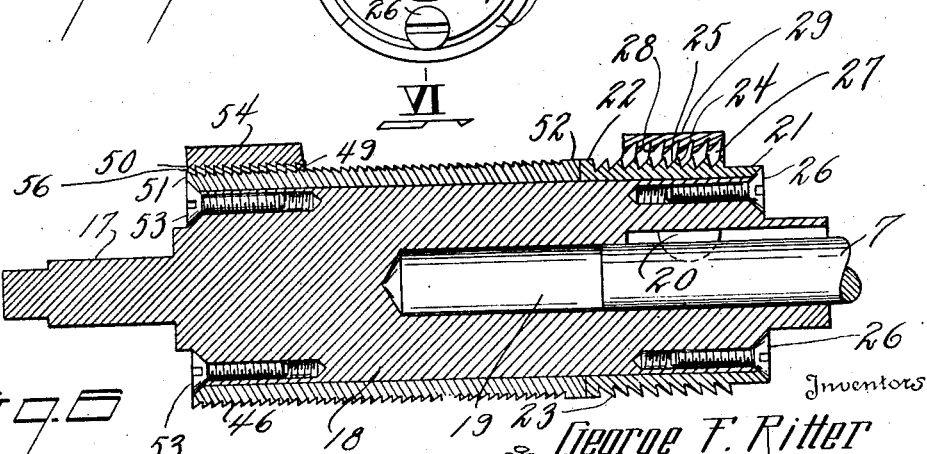
Fig. 6 is a section on the line VI—VI, Fig. 5, of the rotor.

This plate 9 has therefrom and integral therewith cylindrical shell 11 provided with heat conductor or radiating ribs 12. This cylindrical shell 11 terminates in flange 13, opposing which is flange 14, assembled therewith by screws 15 and mounting anti-friction bearing 16 for rotor trunnion 17 (Fig. 6). From this trunnion 17 extends cylindrical core 18 having aligned with the trunnion 17 recess 19, which may slip over the motor shaft 7 and have key 20 as a spline coacting with the motor shaft 7 to effect relative rotation assembly of this core 18 with the motor shaft 7.

Mounted on this core 18 is sleeve 21 terminating in cylindrical portion 22 and having therefrom helical rib 23 with pitch in clockwise rotation of the shaft 7 so that work is toward the motor 3 as to abrupt side 24 of this helical rib 23, less abrupt or slant side 25 being directed away from the motor 3. This helical rib is preferably multiple thread. This cylindrical sleeve 21 is driven on the cylindrical core 18 and held in position thereon by screws 26. This helical rib 23 has clearance 27 (Fig. 6) relative to similar directed complementary pitched helical rib 28 as an interior thread on cylindrical sleeve 29 in the shell 11, anchored against shifting axially by screws 30. This helical rib 28 is desirably of less pitch or advance than the helical rib 23 as complementarily coacting therewith in thereby providing a differential therebetween.

Hopper 31 has sleeve extension 32 to slide into upstanding tube 33, in which is located valve 10 having handle 34 swingable with seat 35 to bring such into engagement with spring stop 35' to open way 36 into communication with way 37 and thereby provide feed for cereal from the hopper 31 to flow past this valve and on the side of spacer or partition 38 coacting with the opposed cylindrical portion 22. This cereal is thus caused to fall in the ribbed way 23 which has supplemental fractional ways 39 with abrupt side 40, effective to engage the material and start such material from the supply past the valve and from the hopper to enter the clearance and be chopped by the complementary abrupt rib sides 24 as cooperating with the sides of the ribs 28. This means that the cereal on entering, say as wheat, is at once chopped and successively moved from rib to rib or fractionally in progressing axially to the core 18 and thence to be discharged into chamber 41 to fall therefrom by spout 42 into vessel say on the base 1. At this stage, if the clearance 27 be for coarse sub-division, the degree of fineness may be adapted say for breakfast food uses.

For greater degree of fineness, the valve handle 34 may be rocked in the opposite direction to bring seat 43 to stop 35' and thereby cause valve portion 44 to close the way 37 and open way 45 on the opposite side of the partition 38 for flow from the hopper 31 to more fine helical rib 46 than the helical rib 23 but of an abrupt side contour in its opposite pitch for progress away from the motor 3 and away from the chamber 41. The cereal or material to be sub-divided is supplied from the hopper in falling on this rotor or rib portion 46 and is urged therein by supplemental ways 47 therein having abrupt sides 48, thereby to take the cereal out of the hopper and insure its entrance into clearance 49 as to complementary differentially similarly pitched rib way 50. These gashes or supplemental ways 39, 40 and 47, 48, are approximately triangular and flat as the portions 39, 47, extend in toward the abrupt or relatively perpendicular sides 40, 48. Accordingly, these provide receiving pockets for the spill from the supply chute or hopper and thus initially start the feed of this material to be subdivided in the cylindrical ways in opposite directions from said feed portions 37, 45. The rib 46 is on sleeve 51 from cylindrical portion 52 as abutting the cylindrical portion 22. This cylindrical sleeve 51 is anchored on the core 18 by screws 53 in opposition to the screws 26 and thereby forming a snug assembly unit for this mill rotor or grinder.

In practice, say for 2 inch diameter rotor and motor rotating at 1750 R. P. M., a sub-division suitable for producing whole wheat bread is effected with the clearance between the rib 46 and the rib 50 of five thousandths to ten thousandths of an inch; while for coarser grinds between the ribs 23 and 28, the clearance may be as much as thirty thousandths as for breakfast foods. Furthermore, the threads on the ribs 46 may be multiple, as four threads of say three to the inch or a total of twelve as against four threads and four to the inch as to the rib 50 or sixteen, in establishing the differential therebetween.

The ribs 50 are internal helical series in sleeve 54 anchored in the shell 11 by screws 55. This flour in passing along clearance way 56 between the ribs 46, 50, is discharged into chamber 57 for flow by spout 58 into vessel on the base 1.

This grinding according to degree of fineness is, in the experience, a factor of depth of the cuts for the ribs and the axial travel. The adaptability of the mill is of course one which may be for a single degree of sub-division or fineness, or multiple, say for the dual extent as shown at the left of Fig. 1, or for further or different sub-division shown at the right of Fig. 1, wherein core 59 has spline assembly with the shaft 7 and carries thereon helical way 60 of greater degree of coarseness and greater diameter than the way or rib 23. The pitch of this rib 23 is for progress toward the motor 3 in clockwise rotation of the shaft 7 in looking toward the left. Clearance 61 about this cylindrical helical way 60 spaces differential pitch rib 62 therefrom in this grinder or mill of slightly larger diameter than this pitch driven from the common power source or motor 3.

Under the disclosure herein one may introduce into a hopper for a pre-selected degree of sub-division effected by selecting hopper for the right or left side of the motor, and as at the left side selecting the more fine as more remote from the motor for spill at the spout 58 or intermediate to have the valve handle 34 so directed that the spill is from the spout 42. In this operation, say for the fine grind and with the way slightly under two inch diameter and the motor speed 1750, with the pitches say sixteen ribs on the interiorly ribbed external sleeve and twelve exterior ribs on the rotor or exteriorly threaded internal member, and clearance of say five to ten thousandths for the way therebetween, the rotation for the motor of 1750 R. P. M. may produce a baking flour from normally dry or moisture content wheat at the rate of ten to twelve pounds per hour. This grinding is effective as a single stage, retains the germ and full wheat values in vitamins.

The material being handled, as cereal, falling below the valve on to the helically ribbed mill element, is engaged in a feed-way interruption as 47 for the rib rotor 46 and thereby carried into the clearance between the complementary interiorly ribbed sleeve and this rotor. The differential pitch therebetween effects a chop action in the carrying axially of the rotor of this cereal, which chopping action is effective in a progressive cutting along the granule or granule remnants repeated in such succession that the discharged product has a degree of uniformity in size and fineness advantageously adapted for incorporation in foods by mixing, baking, or cooking treatments.

Inasmuch as this device is one readily adapted for household use, this freshly milled cereal, whether wheat, rye, barley, or even buckwheat or corn, may not become rancid or objectionable due to the fact that its batch production may be against the necessity of requiring storage but for direct preparation for foodstuffs.

What is claimed and it is desired to secure by Letters Patent is:

A grain cutting mill comprising a cylindrical casing, a hopper discharging between the cylinder ends thereof into the casing, a cylindrical rotor in the casing, said rotor provided with two spaced sets of helical cutting threads of different pitch extending oppositely from a position outwardly from the hopper, cooperating thread sets within the casing pitched in the same direction but differentially with respect to the adjacent rotor threads, feed pockets in each set of rotor threads at points adjacent the hopper discharge, a partition in the hopper base extending to between the spaced sets of rotor threads, a two way valve pivoted in the hopper discharge cooperating with the partition, to alternately feed grain to either set of rotor teeth, and discharge means at the opposite ends of the casing.

GEORGE F. RITTER.
STANLEY F. SAWYER.